Patented Aug. 27, 1935

2,012,611

UNITED STATES PATENT OFFICE 2,012,611

METHOD OF PREPARING EMULSIONS

Samuel Lenher and Charles Titus Mentzer, Jr., Wilmington, Del., assignors to E. I. du Pont de Nemours & Company, Wilmington, Del., a corporation of Delaware No Drawing. Application July 1, 1933, Serial No. 678,714

9 Claims. (Cl. 252—6)

This invention relates to a novel method for preparing emulsions and in particular it pertains to the preparation of water-in-oil emulsions involving the use of insoluble sulfate ester salts of normal straight-chain primary aliphatic alcohols having at least 8 carbon atoms.

According to present practices, water-in-oil emulsions are prepared by the use of heavy metal oleates or stearates as emulsifying agents.

One object of the present invention provides a satisfactory method for preparing water-in-oil emulsions by the use of heavy metal salts of alkyl sulfate esters containing 8 or more carbon atoms and characterized in that the alkyl radical is a normal straight-chain primary radical. Other objects of the invention will appear hereinafter.

The following example illustrates methods for applying principles of the invention. These examples are intended to be construed as illustrative and not as limiting the scope of the invention.

Example

Fifty parts by weight of a heavy paraffin base water-white oil having an A. P. I. specific gravity of 31 ("White Rose" oil) is mixed with 1 part of n-lauryl-1-sulfuric acid which dissolves in the oil. One quarter part of lead acetate is dissolved in 48.75 parts of distilled water. The aqueous lead acetate solution is poured into the sulfate ester-oil solution with rapid stirring at room temperature. The lead salt formed rather slowly and a cream-colored emulsion resulted. This emulsion can be extended without breaking with a large quantity of oil. The emulsion is a heavy grease and has good lubricating properties.

The temperature at which the emulsion may be formed is not critical, but the emulsions are more readily and more economically prepared at low temperatures such as room temperature. Rapid stirring is advisable in order that the emulsion may be rapidly formed.

It is preferred that the salt of the alkyl sulfate ester be prepared in situ according to the method described in the example.

Various types of oils may be treated in accordance with the invention to give stable water-in-oil emulsions. By way of example oils that may be treated in this fashion are Nujol, neat's-foot oil, olive oil, castor oil, cottonseed oil, ordinary petroleum lubricating oils, and the like.

Sulfuric acid esters used in accordance with the present invention may be prepared by treating a normal straight-chain primary aliphatic alcohol having at least 8 carbon atoms and preferably between 12 and 18 carbon atoms (obtainable by the catalytic hydrogenation of the higher fatty acids obtainable from fats or oils, naturally occurring glycerides or alkyl esters of the fatty acids) with strong normally sulfonating agents as 100% sulfuric acid, fuming sulfuric acid or chlorsulfonic acid at a temperature of 0° to 30° C. The resulting compound is a true n-alkyl-1-sulfuric acid which may be neutralized with a water-soluble compound of a metal which forms a water-insoluble salt with a n-alkyl-1-sulfuric acid, such soluble compounds being for example, lead acetate, aluminum chloride, barium chloride and stannous chloride.

Examples of the sulfuric acid esters of normal straight-chain primary aliphatic alcohols, the salts of which may be used in accordance with the present invention are n-lauryl-1-sulfuric acid and the corresponding sulfated products obtained from myristyl, stearyl, cetyl, oleyl, and ricinoleyl alcohols.

The salts which are used to prepare the water-in-oil emulsions are the water-insoluble salts of the alkyl sulfate esters, for example, the lead, aluminum, iron, tin, and barium salts.

The proportion of sulfate ester or ester salt which may be used to prepare the emulsion may be varied between wide limits, e. g., from 0.02% up to 10% by weight of the oil, altho the preferred range is between 0.05% to 2%.

Copending application Serial No. 673,715, filed July 1, 1933, describes and claims emulsions wherein one of the phases is a mineral oil, and wherein the emulsifying agents are selected from the same class as those previously referred to herein.

The invention is particularly applicable to the preparation of water-in-oil emulsions which may be used as lubricating greases, e. g., an emulsion of water in an oil such as an ordinary lubricating oil or other mineral oil. Also emulsions suitable for use as paints (water-linseed oil type), etc., may also be made in this fashion. The emulsions prepared according to the method described above are all stable and are easily diluted with oil within reasonable limits without a decided change in viscosity.

The above description and example are given by way of illustration only. Any variation therefrom which conforms to the spirit of the invention is intended to be included within the scope of the claims.

We claim:

1. A water-in-oil emulsion containing an insoluble sulfate ester salt of a normal straight-chain primary alcohol having at least 8 carbon atoms.

2. A water-in-oil emulsion containing an insoluble sulfate ester salt of a normal straight-chain primary alcohol having from 8 to 18 carbon atoms.

3. A water in oil emulsion containing a heavy metal sulfate ester salt of a normal primary alcohol having from eight to eighteen carbon atoms.

4. A water-in-oil emulsion containing a lead sulfate ester salt of a normal straight-chain primary alcohol having from 8 to 18 carbon atoms.

5. The process of preparing water-in-oil emulsions comprising the step of emulsifying water in oil in the presence of an insoluble sulfate ester salt of a normal straight-chain primary alcohol having at least 8 carbon atoms.

6. The process of preparing water-in-oil emulsions comprising the step of emulsifying water in oil in the presence of an insoluble sulfate ester salt of a normal straight-chain primary alcohol having from 8 to 18 carbon atoms.

7. The process of preparing water in oil emulsions comprising the step of emulsifying water in oil in the presence of a heavy metal sulfate ester salt of a normal primary alcohol having from eight to eighteen carbon atoms.

8. The process of preparing water-in-oil emulsions comprising the step of emulsifying water in oil in the presence of a lead sulfate ester salt of a normal straight-chain primary alcohol having from 8 to 18 carbon atoms.

9. The process of preparing water-in-oil emulsions comprising dissolving in oil a sulfuric acid ester of a normal straight-chain primary alcohol having from 8 to 18 carbon atoms, then agitating the oil solution with a water-solution of a salt which will form a water insoluble salt of the said sulfuric ester ester.

SAMUEL LENHER.
CHARLES TITUS MENTZER, Jr.